(12) United States Patent
Lund-Olesen et al.

(10) Patent No.: US 11,777,123 B2
(45) Date of Patent: Oct. 3, 2023

(54) DIRECT ALCOHOL FUEL CELL

(71) Applicant: Widex A/S, Lynge (DK)

(72) Inventors: Torsten Lund-Olesen, Taastrup (DK); Kasper Vestentoft, Taastrup (DK); Oskar Tynelius, Taastrup (DK); Jacob Lindner Bonde, Taastrup (DK); Jan Harry Hales, Taastrup (DK); Leif Hojslet Christensen, Taastrup (DK)

(73) Assignee: Widex A/S, Lynge (DK)

( * ) Notice: Subject to any disclaimer, the term of this patent is extended or adjusted under 35 U.S.C. 154(b) by 293 days.

(21) Appl. No.: 17/311,018

(22) PCT Filed: Dec. 3, 2019

(86) PCT No.: PCT/EP2019/083386
§ 371 (c)(1),
(2) Date: Jun. 4, 2021

(87) PCT Pub. No.: WO2020/114997
PCT Pub. Date: Jun. 11, 2020

(65) Prior Publication Data
US 2022/0021013 A1     Jan. 20, 2022

Related U.S. Application Data

(60) Provisional application No. 62/776,242, filed on Dec. 6, 2018.

(51) Int. Cl.
*H01M 8/1011*     (2016.01)
*H01M 4/94*     (2006.01)
*H01M 8/10*     (2016.01)

(52) U.S. Cl.
CPC .......... *H01M 8/1011* (2013.01); *H01M 4/94* (2013.01); *H01M 2008/1095* (2013.01)

(58) Field of Classification Search
CPC ................. H01M 8/1011; H01M 4/94; H01M 2008/1095
See application file for complete search history.

(56) References Cited

U.S. PATENT DOCUMENTS

| 5,543,241 A | 8/1996 | Nishioka et al. |
| 7,947,408 B2 | 5/2011 | Ichioka |

(Continued)

OTHER PUBLICATIONS

International Search Report for PCT/EP2019/083386 dated Feb. 17, 2020 (PCT/ISA/210).

(Continued)

*Primary Examiner* — Sarah A. Slifka
(74) *Attorney, Agent, or Firm* — Sughrue Mion, PLLC

(57) ABSTRACT

A direct alcohol fuel cell having a proton exchange membrane (PEM) separating an anode section from a cathode section, which cathode section contains a cathode collection element electrically connected to a cathode catalyst, the cathode catalyst being in diffusive communication with a gaseous oxidant, and which anode section comprises an anode collection element electrically connected to an anode catalyst. The anode catalyst is in diffusive communication with a fuel supply. The PEM is structured to have a bottom and walls extending from the bottom to a containment distance into the cathode section, and the cathode catalyst is located within the containment distance from the bottom. The fuel cell is suited for a microelectronic device.

5 Claims, 2 Drawing Sheets

(56) References Cited

U.S. PATENT DOCUMENTS

| | | |
|---|---|---|
| 2004/0018411 A1 | 1/2004 | Dai |
| 2006/0078785 A1 | 5/2006 | Masel et al. |
| 2010/0190089 A1 | 7/2010 | Akiyama |
| 2010/0255408 A1 | 10/2010 | Lee et al. |
| 2013/0177832 A1 | 7/2013 | Tsubosaka et al. |
| 2015/0202617 A1 | 7/2015 | Hirai |

OTHER PUBLICATIONS

Written Opinion of the International Searching Authority for PCT/EP2019/083386 dated Feb. 17, 2020 (PCT/ISA/237).

DIRECT ALCOHOL FUEL CELL

CROSS REFERENCE TO RELATED APPLICATIONS

This application is a National Stage of International Application No. National Stage Entry of PCT/EP2019/083386 filed Dec. 3, 2019, claiming priority based on U.S. Provisional Application No. 62/776,242 filed Dec. 6, 2018.

FIELD OF THE INVENTION

The present invention relates to a direct alcohol fuel cells (DAFC). The DAFC and its assembly allow miniaturisation of the DAFC, which can be flexibly integrated with a microelectronic device.

PRIOR ART

In general batteries are becoming inadequate with respect to the power requirements for portable electronics. As the development of such devices strives towards smaller devices typically having the same or higher power requirements the limited energy density of conventional batteries becomes critical. Examples of such devices are microelectronic devices e.g. various microsensors, microengines, biomedical microsystems, microelectromechanical systems (MEMS) etc. Hearing aids are an extreme case of such portable devices with high demands on the power source. Currently, high-end hearing aids working at large amplifications have to have replaced the non-rechargeable zinc-air type batteries every 1 to 8 days—depending on the type of the battery and the hearing aid. For example, a hearing aid will typically require about 1 mW when no amplification is needed, and about 10 mW with moderate amplification with higher peaks of 15-20 mW or more when high amplification is required. In principle the Zn-air systems can be categorised as a non-rechargeable fuel cell, but are henceforth referred to as a battery to maintain the distinction towards proton conducting fuel cells.

The ideal power source for these types of devices would have larger energy densities, re-chargeable capabilities and easy handling (when recharging), and DAFCs provide an alternative to Zn-air batteries. Pure methanol and ethanol have 27 and 32 times larger energy densities by weight, respectively, than Zn-Air batteries. When comparing energy density by volume the numbers are 6 and 7 times, thus, ideally providing at least a 6-fold increase in operating time (when neglecting the system volume of the fuel cell). Furthermore, the fuel cell will be capable of being recharged in a matter of minutes or even seconds by simply replenishing the fuel.

DAFCs are well-known in the prior art. In general terms, a DAFC typically comprises a fuel cell stack containing a cathode collection element, a cathode electrode and catalyst, which, via a proton exchange membrane (PEM), are separated from an anode electrode and catalyst, and an anode collection element. Fuel, i.e. alcohol, enters the anode section and $O_2$, e.g. contained in ambient air, enters the cathode section, and due to the selective diffusion of protons across the PEM, oxidation of the alcohol takes place at the anode and reduction of $O_2$ takes place at the cathode so that an electrical potential is generated between the anode and the cathode collection elements to allow the fuel cell to power an electrical circuit.

U.S. Pat. No. 7,947,408 discloses a fuel cell for burning a fuel gas, such as hydrogen, and aims to provide lighter weight fuel cells. U.S. Pat. No. 7,947,408 focuses on providing thinner collecting plates (separators and terminal plates), since the high voltage obtained from stacked fuel cells, requires that the terminal plates are thick enough to collect such high voltage and have a large thermal capacity, but observe that thick collecting plates steal heat generated by adjacent end cells, and tend to adversely affect start-up characteristics at low temperature. U.S. Pat. No. 7,947,408 thus suggests to employ an output terminal that is electrically connected to the collecting section and has a thickness that is greater than the thickness of the collecting section, and further that the collecting section and the output terminal are formed from a single sheet member. The output terminal is formed by bending the output terminal forming portion so that opposing faces come into contact and a first surface of the output terminal forming portion that is positioned on a first side of a bend is flush with a second surface of the terminal forming portion that is positioned on a second side of the bend.

However, the technology of U.S. Pat. No. 7,947,408 relates to hydrogen fuel cells providing high voltages and being of a scale inappropriate for a fuel cell for a microelectronic device.

U.S. Pat. No. 5,543,241 discloses a cell structure for use in a fuel cell and the object is to provide a compact, high-voltage generating fuel cell, which is easy to assemble and whose cell matrix can be easily changed. The cell structure comprises a pair of insulating keep-plates sandwiching the anode, the cathode and the PEM. However, the fuel cell is a hydrogen fuel cell and the high voltage, e.g. 120 V, is not relevant for a fuel cell for a microelectronic device.

In contrast to the challenges faced by U.S. Pat. Nos. 5,543,241 and 7,947,408, DAFCs for microelectronic devices, especially hearing aids, are faced with specific challenges relating to the available space for the fuel cell. It is an aim of the present invention to address this need.

SUMMARY OF THE INVENTION

The present invention relates to a direct alcohol fuel cell (DAFC) comprising a proton exchange membrane (PEM) separating an anode section from a cathode section, which cathode section contains a cathode collection element electrically connected to a cathode catalyst, the cathode catalyst being in diffusive communication with a gaseous oxidant, and which anode section comprises an anode collection element electrically connected to an anode catalyst, the anode catalyst being in diffusive communication with a fuel supply, wherein the PEM is structured to have a bottom and walls extending from the bottom to a containment distance into the cathode section, and wherein the cathode catalyst is located within the containment distance from the bottom.

The DAFC may comprise an inner housing, and a PEM separating an anode section from a cathode section, wherein the anode section contains an anode collection element electrically connected to an anode catalyst, which anode catalyst is in diffusive communication with a fuel supply, and wherein the cathode section contains a cathode collection element having one or more ventilation holes, which cathode collection element is electrically connected to a cathode catalyst, which cathode catalyst via the one or more ventilation holes is in diffusive communication with a gaseous oxidant, the inner housing having a bottom and walls extending from the bottom to a length sufficient to contain the anode section, the PEM and the cathode section, the bottom and/or the walls having holes allowing fluid communication from a fuel supply to the anode section.

The DAFC may comprise a housing containing a PEM separating an anode section from a cathode section, which anode section and which cathode section are contained in the housing, the cathode section comprising a cathode collection element electrically connected to a cathode catalyst, which cathode catalyst is in diffusive communication with a gaseous oxidant, and the anode section comprising an anode collection element electrically connected to an anode catalyst, and a pervaporation membrane located at a spacing distance from the PEM, which pervaporation membrane provides diffusive communication between the anode catalyst and a fuel supply, wherein the housing comprises one or more venting holes providing fluid communication between the anode section and the ambient environment, which venting hole has or which venting holes have a largest dimension in the range of 25 µm to 300 µm, the venting hole being located within the spacing distance.

The DAFC may comprise a housing containing a PEM separating an anode section from a cathode section, which anode section and which cathode section are contained in the housing, the cathode section comprising a cathode collection element having one or more ventilation holes, which cathode collection element is electrically connected to a cathode catalyst, which cathode catalyst is in diffusive communication with a gaseous oxidant, and the anode section comprising an anode collection element electrically connected to an anode catalyst, the DAFC comprising an oleophobic filter covering the ventilation hole(s). The oleophobic filter may be held in place using any appropriate means as desired.

In the context of the invention, the PEM and other optional membranes and layers in the anode section and/or the cathode section, the anode catalyst, the anode collection element, the cathode catalyst and the cathode collection element may collectively be referred to as the "fuel cell components", and either of these components may be referred to as a "fuel cell component". The structure, e.g. the inner housing, containing the fuel cell components may be referred to as a "power pack".

The inner housing may be made from any material as desired. For example, the inner housing may be made, e.g. injection moulded, from an electrically non-conductive thermoplastic elastomer. Thereby, the inner housing provides electrical insulation between the fuel cell components, and between the fuel cell components and any exterior component. However, it is preferred that the inner housing is made from an electrically conductive metal. Thereby, the inner housing can be electrically connected to the anode collection element or the cathode collection element to provide an anode terminal site or a cathode terminal site, respectively. When the inner housing is electrically connected to the anode collection element, especially when the inner housing serves as the anode terminal, assembly of the power pack is simplified. Likewise, when the inner housing is electrically connected to the cathode collection element, especially when the inner housing serves as the cathode terminal, assembly of the power pack is also simplified.

The inner housing and/or the anode collection element may be made from a thermoplastic elastomer appropriately coated with an electrically conductive metallic surface or equipped with tracks of an electrically conductive metal to allow the anode collection element to be electrically connected with the anode catalyst. Correspondingly, the cathode collection element may be made from a thermoplastic elastomer appropriately coated with an electrically conductive metallic surface or equipped with tracks of an electrically conductive metal to allow the cathode collection element to be electrically connected with the cathode catalyst It is preferred that the inner housing is the anode collection element. In particular, it is preferred that the inner housing/anode collecting is made from a single piece of electrically conductive metal, e.g. stainless steel, optionally coated with gold. By employing the inner housing as the anode collection element the volume of the power pack is reduced so that a DAFC with the power pack is especially suited for microelectronic devices.

In another embodiment, the inner housing is the cathode collection element. It is preferred that the inner housing/cathode collecting is made from a single piece of electrically conductive metal, e.g. stainless steel, optionally coated with gold. By employing the inner housing as the cathode collection element the volume of the power pack is reduced so that a DAFC with the power pack is especially suited for microelectronic devices.

When the anode collection element is the inner housing the anode collection element may also be referred to as an "anode cup". In a preferred embodiment, the anode terminal site is provided as an anode cup. Correspondingly, the cathode collection element may be the inner housing, and the cathode collection element may be referred to as a "cathode cup". In a preferred embodiment, the cathode terminal site is provided as a cathode cup.

The inner housing may have a length, e.g. a "Z-dimension", to contain the anode section, the PEM and the cathode section so that the inner housing can be considered to be a power pack. The length will typically be the minimal length to house the fuel cell components in order to minimise the volume of the power pack. The PEM may have a first dimension, e.g. an "X-dimension", and a second dimension, e.g. a "Y-dimension", and these are typically of the same approximate size. For example, the X:Y ratio may be in the range of 1:10 to 10:1, e.g. 1:5 to 5:1, or 1:2 to 2:1, e.g. X may be in the range of 2 mm to 30 mm, e.g. 5 mm to 15 mm. When X of the PEM is in the range of 2 mm to 30 mm, e.g. 5 mm to 15 mm, and the X:Y ratio is in the range of 1:2 to 2:1, the Z-dimension, or the length, of the inner housing may also be in the range of 1 mm to 15 mm, e.g. 1 mm to 2 mm, while the DAFC can provide a power output up to 30 mW, e.g. in the range of 1 mW to 10 mW. In an embodiment the length, i.e. the Z-dimension, of the inner housing is in the range of 1 mm to 10 mm. The first and the second dimension of the PEM will typically be uniform over the length of the inner housing.

The inner housing may have a bottom and walls. The bottom will have dimensions to house the PEM, but the bottom is not limited to a particular shape. For example, the bottom may be rectangular or square, e.g. with rounded corners, or the bottom may be circular or elliptical. The inner housing has holes allowing fluid communication from a fuel supply to the anode section. The holes may be located in the bottom and/or in the walls depending on the location of the fuel supply. The inner housing may have any number of holes as desired, e.g. 1 to 20, or 5 to 10, and the holes may have any size and shape as desired. For example, the inner housing may have 3 to 8, e.g. 5, holes distributed over the bottom of the inner housing. The holes may be circular and have a diameter in the range of 500 µm to 2 mm.

It is preferred that the holes are in the bottom of the inner housing and the DAFC further contains an external housing with a fuel reservoir. For example, the external housing may also have a bottom and walls extending from the bottom. The walls of the external housing may extend to house the power pack in the external housing, and the fuel reservoir is located at the bottom of the external housing. In another embodiment the external housing contains the fuel reservoir but does not contain a substantial portion of the power pack. For example, the external housing may be considered to be a fuel reservoir that is attached to the power pack.

The collection elements will be electrically connected to terminal sites that may be part of the DAFC or that may be external to the DAFC. The collection elements and the terminal sites are electrically conducting and both, alone or collectively, may also be described as electrically conducting. Thus, the anode collection element and the cathode collection element "collect" electricity and by being electrically connected to an external electrical circuit, e.g. via the terminal sites, the DAFC supplies electricity to the external electrical circuit. Thus, the anode collection element will be electrically connected to an anode terminal site, and the cathode collection element will be electrically connected to a cathode terminal site. The terminal sites allow that the DAFC is electrically connected to an external electrical circuit that can be powered with the DAFC. The terminal sites are typically located on or at an outer surface of the DAFC.

The cathode collection element and the anode collection element may have a generally planar structure, e.g. the collection elements may be "flat", or the collection elements may deviate from a planar structure. For example, the external housing may have a shape to fit a specific purpose, so that the external housing also has a surface deviating from a planar surface. In particular, the anode collection element may be the inner housing having a bottom and walls extending from the bottom to a length sufficient to contain the anode section, the PEM and the cathode section, the bottom and/or the walls having holes allowing fluid communication from a fuel supply to the anode section. In another embodiment, the cathode collection element is made as a single piece together with a cathode terminal site extending from the cathode collection element. For example, the cathode collection element with a cathode terminal site may be a single flat piece with a bendable segment between the cathode collection element and the cathode terminal site.

The DAFC may comprise a weld plate having one or more ventilation holes, which weld plate is welded to the housing to enclose the PEM, the anode section and the cathode section. The weld plate holds the optional oleophobic filter in place and further closes off the cell from pollution, except through the $CO_2$ hole and the ventilation holes, when present. The housing may be the inner housing, e.g. an anode cup or a cathode cup, or the housing may be the external housing, and the weld plate is preferably of the same material as the housing. When the weld plate is welded to an anode cup, the weld plate will provide an anode terminal site, and in particular, the inner housing will also provide an anode terminal site. When the weld plate is welded to a cathode cup, the weld plate will provide a cathode terminal site, and in particular, the inner housing will also provide a cathode terminal site.

In other embodiments, the oleophobic filter is held in place by overmoulding of a polymer or gluing. Overmoulding of a polymer and gluing will protect the part of the cell between cathode collection element and the anode cup edge from outside contamination.

When the weld plate is welded to the anode cup, it is preferred that the cathode collection element is formed from one piece, e.g. a single piece of metal, such as stainless steel, optionally coated with gold, including a cathode terminal site extending from the cathode collection element, and that the anode cup may contain, e.g. in a wall or in the optional weld plate, an opening, e.g. a cut-out, for extending the cathode terminal through. Alternatively, the wall of the inner housing, e.g. the anode cup, may contain an opening for receiving a cathode terminal site and establish an electrical connection from the cathode terminal site to the cathode collection element. Correspondingly, an external housing to which the weld plate is welded may also contain an opening for allowing an electrical connection to be established with the cathode collection element.

When the DAFC has an anode cup with an opening for the cathode terminal site or a cathode cup with an opening for the anode terminal site, the DAFC preferably contains electrically insulating layers or coatings, e.g. electrically insulating materials, such as a polyimide film, e.g. Kapton (as marketed by DuPont, Wilmington, Del., USA), to prevent direct contact, and thereby short-circuiting, between the cathode terminal site and the anode terminal site. Neither the inner housing nor the external housing is required to have an opening for the cathode collection terminal or the anode collection terminal to extend out of the inner housing/external housing, but regardless of the presence of an opening, it is preferred that the DAFC comprises an electrically insulating material to prevent contact between the cathode terminal site and the anode terminal site.

By being welded to the housing, the weld plate provides a generally fluid tight structure of the DAFC, and it is ensured that the only access to the cathode section is via the ventilation holes of the weld plate and the cathode collection element, e.g. through any filters or membranes adjacent to the cathode collection element. In particular, the weld may follow the perimeter, e.g. the full perimeter, of the housing, whether the inner housing or the external housing.

The DAFC may also comprise a gasket, e.g. a silicone gasket, located along the perimeter of the weld. A gasket employed with a DAFC comprising a weld plate simplifies assembly of the DAFC with an external microfluidic device, e.g. in an appropriate seating, provides an extra level of fluid tight coupling between the DAFC and the seating.

The weld plate or a similar element, e.g. an overmoulded polymer or glue, allow the DAFC to contain additional layers outside the cathode section. For example, the weld plate allows that an oleophobic filter is located between the cathode collection element and the weld plate, although an oleophobic filter may also be used without a weld plate. An oleophobic filter protects the cathode section from penetration of liquids like sweat, oil and grease, e.g. through the ventilation holes of the cathode collection element. The DAFC may also contain an anion-exchange membrane in the cathode section, in particular between the oleophobic filter and the cathode catalyst. An anion-exchange membrane sequesters negative charged ions, e.g. chloride ions contained in sweat, that have entered the cathode section. Thereby, the DAFC can be protected from penetration of sweat, oil, grease etc. and a DAFC is provided that is especially suited for a microelectronic device to be carried close to the skin of an end-user, e.g. a hearing aid or a smart watch. In an embodiment, the DAFC contains both an oleophobic filter and an anion-exchange membrane. It is preferred that the oleophobic filter is adjacent to the cathode collection element, e.g. the oleophobic filter is in contact with the cathode collection element.

In a further embodiment, the DAFC contains a filter, e.g. a microfilter with a pore size in the range of 0.1 μm to 25 μm, which microfilter covers the ventilation hole(s) of the cathode collection element and the optional weld plate. The microfilter may be between the weld plate, when used, and the cathode collection element or the microfilter may be between the cathode collection element and the cathode diffusion layer, when used, or the cathode catalyst. A microfilter prevents particles, e.g. as determined by the pore size of the filter, from entering the cathode section. Thus, a more robust DAFC is provided by the microfilter.

The DAFC has different sections, e.g. an anode section and a cathode section, which are separated from each other. In the context of the invention, the terms "separate", "separated" or "separating" mean that mass transfer between such sections is limited by the entity separating the sections. In the context of the invention, mass transfer may refer to mass transfer across a membrane, within a section of the DAFC, e.g. within the anode section or within the cathode section, from the ambient environment to a section or from a section to the ambient environment. "Mass transfer" is to be understood broadly and covers at least fluid communication, mass transfer via diffusion ("diffusive communication") mass transfer via convection, and mass transfer via pervaporation ("pervaporative communication"). For example, the PEM allows selective transportation of protons across the membrane. Likewise, "fluid communication" generally means that bulk transfer of fluid, i.e. a liquid and/or a gas, is possible, e.g. via a hole or an opening.

Mass transfer generally requires a driving force to affect the mass transfer. For example, a fuel may be supplied to a reservoir by pumping, and the high concentration of the fuel in the reservoir, e.g. 20 M methanol or more, will allow that the methanol evaporates into the anode section, e.g. via the pervaporation membrane, due to the concentration difference between the reservoir and the anode section. When $CO_2$ is produced in the anode section, the increase in pressure may push the $CO_2$ away from the anode section e.g. via a venting hole. Furthermore, heat generated in the production of the $CO_2$ will create a convective flow of the $CO_2$. The combination of a pervaporation membrane and a venting hole in the anode section allows that the DAFC is operated with a high, e.g. at least 10 M, concentration of methanol which gives a high energy density. This in turn allows that the DAFC is operated passively, i.e. without actively moving fuel and waste components in the anode and cathode sections as relevant, and thereby a microscale DAFC, e.g. with a PEM having an area of 1 $cm^2$ or less, is possible. Thus, the combination of the pervaporation membrane and the venting hole provides a passive microscale DAFC with a high energy density.

In the context of the invention "pervaporation" refers to a situation where a liquid is found on one side of a membrane that allows transfer of molecules from the liquid through the membrane as a gas on the other side of the pervaporation membrane. Correspondingly, "pervaporative communication" means that bulk transfer of fluid, in particular liquid, is not possible but that pervaporation of appropriate constituents is possible. When the anode section of the DAFC contains a pervaporation membrane the liquid alcohol fuel will be on one side of the pervaporation membrane, i.e. the fuel supply side, and that gaseous fuel will be on the other side, i.e. the side facing the PEM. Thus, the pervaporation membrane prevents access of liquid fuel to the (anode) catalyst and thereby the orientation of the DAFC is not relevant. This is especially relevant for a DAFC used in a microelectronic device worn by an end-user, e.g. a hearing aid. A microelectronic device worn by an end-user will naturally follow the movements of the end-user so that gravity may affect any direction of the DAFC, but when a pervaporation membrane is included in the anode section the liquid fuel will be prevented from reaching the PEM, regardless of the orientation of the DAFC due to movement of the end-user. This advantage is especially relevant when the DAFC also contains a venting hole in the anode section.

By preventing access of the liquid fuel to the section having the venting hole, i.e. the section within the spacing distance from the PEM, loss of liquid fuel via the venting hole is prevented while at the same time allowing $CO_2$ to leave the anode section. Thus, the invention provides a DAFC for a hearing aid, which works independently of the orientation of the hearing aid.

Pervaporation may also be referred to as "diffusion", and pervaporative communication may also be referred to as "diffusive communication", and the two terms may be used interchangeably. However, "diffusive communication" especially also refers to a situation where the same phases, e.g. liquid phases or gaseous phases, exist on both sides of the membrane. For example, a pervaporation membrane allows pervaporation of fuel, especially methanol, from a side with a high concentration, e.g. the fuel supply side, to a side with lower concentration, e.g. the anode section. An oleophobic filter allows diffusion of a gaseous oxidant from the ambient environment to the cathode section.

The DAFC has an anode catalyst and a cathode catalyst, which are in diffusive communication with a fuel supply and a gaseous oxidant, respectively. In the context of the invention, the term "catalyst" refers to any appropriate catalytic material, especially in the form of particles, e.g. platinum or mixtures of platinum and ruthenium. The catalyst may be deposited on or otherwise be in contact with further materials. For example, the catalyst particles may be on a support material. When the catalyst, e.g. catalyst particles, are deposited on a substrate, the substrate with the catalyst may be referred to as an "electrode" in the context of the invention. The catalyst will typically be found on a support, and when the catalyst is described as a "catalyst layer", this generally refers to the support with the catalyst material. The catalyst may be together with a proton conductor, e.g. Nafion, be placed on a gas diffusion substrate, e.g. carbon paper or carbon cloth, which may also be referred to as an electrode or a gas diffusion electrode. The appropriate catalyst particles, e.g. platinum or platinum-ruthenium particles, are preferably located on a support material with a high specific surface area, e.g. a carbon material, such as carbon nanoparticles, carbon nanotubes, carbon fibres, etc. A support material of a high specific surface area may distribute a liquid over the high specific surface area so that the liquid is more easily evaporated. A support is not required for the catalyst particles and these may also be placed on the PEM or another material having proton conducting properties.

Both the anode section and the cathode section may further contain one or more diffusion layers, e.g. a layer of carbon fibres, that, together with the support material of the respective catalysts, promote diffusion of fuel, e.g. methanol, to the anode catalyst and $O_2$ to the cathode catalyst. It is also contemplated that the catalyst particles may be integrated with the diffusion layer. The diffusion layer may also be referred to as a "water management layer" (WML). A WML typically also affects the water retention of the system.

The DAFC contains a membrane, e.g. at least a PEM. In the context of the invention the term "membrane" is to be understood broadly, and any membrane providing the desired functionality can be used. In the context of the invention a membrane is non-porous, and the membrane is considered to prevent fluid communication but to generally allow diffusion, e.g. pervaporation, through the membrane while optionally also preventing diffusion of specific constituents.

The DAFC contains a PEM that separates the anode section from the cathode section, but the DAFC may also contain other membranes. A membrane may be a polymeric material with a backbone optionally carrying relevant groups providing a functionality. Typical membrane materials are silicone, polyether ether ketone (PEEK), and fluoropolymers. For example, a membrane, especially a pervaporation membrane, may have a fluoropolymer backbone of poly-tetrafluoroethylene (PTFE), and the PTFE may optionally have perfluoroether pendant side chains terminated by sulphonic acid groups to provide negative charges. A PTFE backbone will generally prevent liquids from passing through the membrane while allowing diffusion through the membrane. For example, sulphonic acid groups on a PTFE membrane, e.g. a Nafion membrane, may attract water molecules that diffuse into the membrane to improve the proton conducting properties of the membrane.

The DAFC may contain a pervaporation membrane that is permeable to gasses but impermeable to liquids. A pervaporation membrane may also be referred to as a "semipermeable membrane". The pervaporation membrane may for example be made from silicone, PEEK, and/or PTFE. The pervaporation membrane may also comprise charged groups providing ion exchange capabilities to the pervaporation membrane. For example, the pervaporation membrane may be or comprise a PTFE backbone with perfluoroether pendant side chains terminated by sulphonic acid. The DAFC may also contain uncharged pervaporation membranes that generally allow diffusion through the membrane while preventing bulk transfer of liquid.

Membranes based on hydrogels may also be used. A hydrogel is generally considered to allow diffusion, e.g. easy diffusion, of $H_2O$ molecules, so that a hydrogel may be permeable, e.g. via diffusion, to aqueous liquids or other hydrophilic liquids. A hydrogel may contain positively or negatively charged groups for sequestering ions of the opposite charge from aqueous liquids passing through the membrane, i.e. the hydrogel may be an ion-exchange membrane.

Furthermore, the DAFC may contain a cation-exchange pervaporation membrane, e.g. a negatively charged pervaporation membrane, e.g. a polymer with a PTFE backbone carrying perfluoroether pendant side chains terminated by sulphonic acid groups, that allows diffusion of fuel and waste components to or from the electrodes while preventing diffusion of positively charged ions, in particular metal ions. Likewise, the DAFC may contain an anion-exchange membrane, e.g. polymeric anion-exchange membrane or a hydrogel membrane with positively charged groups, that allows diffusion of fuel and waste components to or from the electrodes while preventing transfer of negatively charged ions, in particular chloride ions. Ion-exchange membranes may also be referred to as "charged membranes", e.g. "positively charged membranes" or "negatively charged membranes" and the terms may be used interchangeably. In the context of the invention, a membrane is considered to be charged, e.g. positively charged or negatively charged, when the membrane has covalently attached groups of the corresponding charge; the overall charge of the membrane will be balanced by oppositely charged ions in the fluid in contact with the membrane but the membrane may still be referred to as "charged". A cation-exchange membrane will typically be "loaded" with hydrogen ions so that when further hydrogen ions are applied to the cation-exchange membrane it will appear to be permeably to hydrogen ions. Thus, a cation-exchange membrane may be "proton conductive" in the context of the invention.

In an embodiment, the cathode section comprises an anion-exchange membrane. The anion-exchange membrane is preferably placed between the cathode catalyst and the cathode collection element, e.g. between the cathode catalyst, which may be deposited on a support so at to provide a cathode electrode, and the cathode WML when present. Any membrane material is relevant for the anion-exchange material, but in a specific embodiment the anion-exchange membrane is a PEEK membrane with positive charges, e.g. from quaternary or other amine groups. Other relevant membrane materials comprise polyester or PTFE. The thickness of the anion-exchange membrane may be in the range of 10 μm to 500 μm, e.g. 50 μm to 200 μm, and the ion-exchange capability may be in the range of 0.5 mmol/g to 2 mmol/g. An exemplary anion-exchange membrane is the polyester membrane marketed as fumapem FAA-3-30 (Fumatech BWT GmbH, Bleitigheim-Bissingen, Germany), which has a thickness in the range of 27 μm to 31 μm and, an ion-exchange capacity of about 1.6 mmol/g. A hydrogel based anion-exchange membrane is also contemplated. The anion-exchange membrane generally allows easy diffusion of water through the membrane while the positive charges provide an anion-exchange function so that negative ions, e.g. $Cl^-$, will be sequestered in the anion-exchange membrane and prevented from reaching the cathode catalyst. An anion-exchange membrane is especially suited for a microelectronic device worn by an end-user, e.g. a hearing aid or a smart watch, where the microelectronic device may come into contact with sweat from the end-user, since the anion-exchange membrane will protect the DAFC from penetration of sweat into the cathode section.

In the context of the invention a membrane is non-porous, e.g. any pores in the membrane will be in the nanometer range. The DAFC may also contain filters, e.g. an oleophobic filter. A "filter", in contrast to a membrane, is porous and has a defined pore size, especially larger than the nanometer range. A filter, e.g. an oleophobic filter, as used in the DAFC may also comprise further openings that are larger than the pore size. An example of an oleophobic filter is a porous, e.g. microporous, perfluoro derivatised polymeric material, e.g. PTFE.

A DAFC will produce $CO_2$ in the anode section and for many types of DAFC it will use $H_2O$. In the cathode section the DAFC will produce $H_2O$ and may also produce $CO_2$ because of crossover of fuel from the anode side to the cathode side. $CO_2$ can diffuse away from the respective sections, but in general mass transfer of $CO_2$ will typically also be driven by pressure and moreover the oxidation of carbon containing species to $CO_2$ will produce heat so that mass transfer of $CO_2$ may also be via convection. Thus, since the pressure increases in the cathode section when $CO_2$ is produced, $CO_2$ will be pushed away from the cathode catalyst, e.g. via ventilation holes in the cathode collection element. The DAFC especially produces $CO_2$ in the anode section, and $CO_2$ produced in the anode section may diffuse away from the anode section via the PEM or via the pervaporation membrane. However, when the DAFC comprises a venting hole located in a housing, the venting hole advantageously allows the $CO_2$ to be removed from the anode section due to build-up of pressure but also due to convection and via diffusion. In particular, the removal of $CO_2$ through the venting hole is more efficient than diffusion through the PEM. A single venting hole is sufficient for allowing removal of $CO_2$ from the anode section, and in particular, a single venting hole prevents a flow into the anode section due to the higher pressure in the anode section compared to the pressure in the ambient environment. For example, when the DAFC comprises 2 or more ventilation holes, it is contemplated that a different flow profile for the $CO_2$ in the anode section may occur due to convection in the anode section so that a flow may be created through the anode section, e.g. $CO_2$ exits via one ventilation hole whereas another ventilation hole allows a flow from the ambient environment into the anode section. In a preferred embodiment, the DAFC contains only a single venting hole.

The venting hole has a largest dimension in the range of 25 µm to 300 µm, but it may have any shape as desired. For example, the venting hole may be elliptical with a minor axis and a major axis, e.g. with a length in the range of 25 µm to 300 µm, where the length of the minor axis is in the range of 50% to 100% of the length of the major axis. In particular, the venting hole may be circular with a diameter in the range of 25 µm to 300 µm, e.g. about 50 µm. It is also contemplated that the venting hole may be rectangular, e.g. with a first dimension having a length of 50% to 100% of a second dimension. In particular, a rectangular venting hole may be square. Thus, the venting hole may be square with a diagonal in the range of 25 µm to 300 µm, e.g. about 50 µm. When the venting hole has a largest dimension in the range of 25 µm to 300 µm, the inventors have surprisingly found that an optimal balance is reached between removal of $CO_2$, prevention of entry of $O_2$ into the anode section, and prevention of loss of alcohol fuel. Insufficient venting of $CO_2$, e.g. when a venting hole smaller than 25 µm is present, or when no venting hole is present, will result in a pressure build up which limits the max power and increases the risk of flooding, Moreover, the insufficient venting of $CO_2$ that occurs when no venting hole or a too small venting hole is present will also reduce the maximum power available from the DAFC. When the DAFC has a venting hole with a dimension larger than 300 µm, $CO_2$ will be removed efficiently from the anode section, but the anode section will also lose fuel through the evaporation hole at a rate sufficiently high to reduce the operating time and require refueling too soon. Furthermore, when the ventilation hole has a diameter, larger than 300 µm, $O_2$ may enter the anode section, in particular when the DAFC is running low on fuel, which will shorten the lifetime of the DAFC. Thus, by using a ventilation hole, e.g. a circular ventilation hole, as defined above, the life time of a DAFC can be increased. Thus, the optimal size of the venting hole is a compromise between sufficient venting and a too open structure, for which the optimum is dependent on max power and size of the cell. For the cell presented in this text a venting hole of 40-100 µm has proven a good compromise. When the venting hole has a largest dimension in the range of 25 µm to 200 µm, e.g. in the range of 40 µm to 100 µm, in particular when the largest dimension is in the range of 40 µm to 60 µm, the venting hole provides an optimal compromise between sufficient venting and a too open structure, and both the fuel loss and the entry of $O_2$ into the anode section will be insignificant.

In a specific embodiment, the DAFC has 2 or more ventilation holes. In particular, the DAFC may have 2 ventilation holes with a largest dimension in the range of 25 µm to 100 µm. When the DAFC has 2 or more ventilation holes, more efficient removal of $CO_2$ is possible, especially when the 2 or more ventilation holes are distributed, e.g. evenly distributed, on the surface of the housing.

The ventilation hole or ventilation holes allow fluid communication with the ambient environment, which may contain particles, e.g. dust, of a size small enough to enter the anode section. However, due to the pressure build-up in the anode section penetration of particulate contaminants into the anode section is generally avoided. However, it is preferred that the DAFC comprises 2 or more small ventilation holes with a largest dimension in the range of up to 75 µm, e.g. circular ventilation holes with diameters in the range of 40 µm to 60 µm. The smaller the cross-sectional area of the ventilation holes, the larger the flow velocity of $CO_2$ exiting the anode section and thereby the smaller the risk that unwanted particles enter the anode section. The same effect is relevant to prevent entry of $O_2$ into the anode section.

In an embodiment, the venting hole or venting holes comprise a filter, e.g. a filter covers the venting hole. A filter, e.g. with a pore size in the range of 0.1 µm to 20 µm, will limit the entry of particles with a size corresponding to the pore size of the filter and prevent entry of particles larger than the pore size. The filter typically has a thickness in the range of 10 µm to 500 µm. The inventors have surprisingly found that even though the filter provides a pressure drop over the filter, a filter, e.g. with a pore size in the range of 0.1 µm to 10 µm, does not negatively affect the removal of $CO_2$ from the anode section. In a specific embodiment, the filter is an oleophobic filter, e.g. a filter comprising a PTFE polymer backbone with pores in the size range of 0.1 µm to 20 µm and a thickness in the range of 50 µm to 500 µm. An oleophobic filter limits penetration of liquids and further limits penetration of oil and grease into the anode section without affecting removal of $CO_2$ from the anode section.

When the DAFC has a venting hole, the pervaporation membrane may be of a PTFE-type as defined above, and it may have negatively charged groups, e.g. the PTFE may have perfluoroether pendant side chains terminated by sulphonic acid groups, but the charges do not influence the function of the venting hole. The pervaporation membrane, regardless of the presence of charges, functions together with the venting hole, and the balance between removal of $CO_2$ and prevention of loss of fuel is improved when a venting hole is employed in combination with the pervaporation membrane. However, it is also contemplated that the venting hole may be used without a pervaporation membrane. Regardless of the presence of a pervaporation membrane, the spacing distance will typically be in the range of 100 µm to 300 µm.

The venting hole is located between the PEM and the pervaporation membrane, i.e. the spacing distance from the PEM. When the venting hole is located within the spacing distance, the venting hole is available for removal of $CO_2$ produced in the anode section. Thus, in a preferred embodiment the DAFC has a venting hole, e.g. a circular venting hole, with a largest dimension, e.g. diameter, in the range of 30 µm to 80 µm, which venting hole is located at a distance corresponding to 30% to 70% of the spacing distance as measured from the PEM. In this embodiment, the optimal balance between removal of $CO_2$ from the anode section, prevention of entry of $O_2$ into the anode section, and prevention of loss of fuel, in particular methanol, is obtained.

The DAFC may also comprise a spacer insert layer between the pervaporation membrane and the PEM, i.e. between the pervaporation membrane and the anode catalyst, or between the pervaporation membrane and the optional anode diffusion layer. A spacer insert layer is preferably electrically conducting, e.g. it may be a sheet of stainless steel, optionally coated with gold, and it may have one or more holes with a total area in the range of 5% to 90%, e.g. 10% to 80% or 25% to 50%, of the total area of the spacer insert layer. The spacer insert layer will typically have a total area corresponding to the available area, e.g. as defined by the cross-section of an inner housing. The hole or holes in the spacer insert layer especially promote transfer, e.g. by convention, diffusion or pressure differences, of $CO_2$ away from the anode catalyst and therefore the venting hole functions more efficiently when a spacer insert layer is employed. When a spacing distance of at least 50 μm is used between the pervaporation membrane and the PEM, it is preferred that the spacer insert layer is used. Thus, the spacing distance will correspond to the thickness of the anode catalyst, the optional anode diffusion layer, and the spacer insert layer. The spacer insert layer will typically have a thickness in the range of 50 μm to 200 μm, e.g. 75 μm to 125 μm, such as about 100 μm.

The venting hole may be located in a housing of the DAFC. The housing may be an inner housing, in particular an anode cup or a cathode cup, or the housing may be an external housing. The venting hole will be in the wall of the housing, and when the DAFC has both an inner housing, e.g. an anode cup or a cathode cup, and an external housing the venting hole will be in the inner housing. In particular, it is preferred that the external housing provides a fuel reservoir and that the external housing is attached to the inner housing without covering the location of the venting hole or venting holes in the inner housing. However, the external housing may have a hole aligned with the venting hole in order to provide fluid communication between the anode section and the ambient environment. The hole in the external housing is not limited and may be any size equal to or larger than the venting hole. In particular, when the external housing is adjacent to, e.g. in electrical connection or in electrically insulated contact with, the inner housing, the venting hole in the inner housing is preferably aligned with the hole in the wall of the external housing.

In another embodiment, there is a distance, e.g. a normal distance in the range of 10 μm to 200 μm, between the inner housing and the external housing, and the venting hole in the inner housing may be aligned with a hole in the wall of the external housing, or there may be a hole in the external housing that is not aligned with the venting hole in the inner housing.

Regardless of the location of the venting hole in the housing, the presence of a venting hole improves the general mass transfer, e.g. of alcohol fuel, such as methanol, by aiding in the removal of $CO_2$ from the anode section, and thereby the venting hole can be considered to improve the maximum power of the DAFC. Without being bound by theory, the present inventors believe that the effect obtained from the pervaporation membrane in the anode section in allowing the DAFC to be operated with passive mass transfer, i.e. without active pumping, e.g. of alcohol fuel and waste components, is also improved. Thus, a venting hole and a pervaporation membrane in the anode section allow the DAFC to be used with passive mass transfer and without active pumping. However, the fuel reservoir, when present, may still be filled using active pumping which does not provide any effect on the mass transfer in the anode section and the cathode section. A DAFC supplied with fuel from an external supply is considered to be a "passive" fuel cell in the context of the invention. Likewise, the DAFC may employ active removal of waste gasses from the outside of the housing; this embodiment is also considered to be a passive fuel cell.

The fuel cell components of the DAFC are generally arranged in layers, and each layer may correspond to an available surface area. For example, the DAFC may have a surface area of the PEM, a surface area of the anode section and a surface area of the cathode section. The different surface areas may be of the same or different sizes. Elements constituting a layer will typically fill the area available for the layer. In particular, catalyst layers will fill the available area in order to optimally use the available area. Likewise, any membrane included in the DAFC, whether in the anode section or the cathode section, will typically also fill the available area.

The DAFC may comprise an oleophobic filter, which covers the ventilation hole(s) of the cathode collection element. Oleophobicity, and correspondingly also hydrophobicity, may be defined in terms of contact angles between a material and an appropriate solvent, i.e. an "oil like" solvent for oleophobicity and a "water like" solvent for hydrophobicity. Thus, an appropriate oil-like solvent is n-hexadecane, and when the contact angle between n-hexadecane and the surface of the material is in the range of 60-80° the material is considered to be oleophobic. For example, for PTFE n-hexadecane has a contact angle of about 65° so that PTFE is oleophobic. Any material, in particular any polymer, with a contact angle between n-hexadecane and the material of at least 60° is oleophobic in the context of the invention and may be used for the oleophobic filter. The oleophobic filter may be on either side of the cathode collection element. When the oleophobic filter is between the cathode collection element and the cathode electrode, the oleophobic filter is designed to allow that the cathode collection element is electrically connected to a cathode catalyst. Any appropriate material may be used for the oleophobic filter. For example, the oleophobic filter may comprise a polymeric backbone providing a sheet or the like of a thickness in the range of 20 μm to 500 μm, e.g. 100 μm to 200 μm, and having pores in the size range of 0.1 μm to 20 μm, e.g. 0.1 μm to 1.0 μm. The polymeric backbone may be any polyolefin backbone or a fluoropolymer backbone. An especially preferred backbone is a fluoropolymer, such as PTFE. In an embodiment, the backbone does not comprise any charged groups, e.g. acid groups or amine groups. The perfluoro groups of the polymer backbone will minimise penetration of liquid water through the pores of the filter, even when the water is applied at a pressure higher than normal atmospheric pressure, while the pores allow transfer of gaseous molecules. The perfluoro groups further limit the penetration of oils and oil like liquids into the cathode section. Another appropriate material is microporous polyvinylidene fluoride with thicknesses and pore sizes in the range of 20 μm to 500 μm and 0.1 μm to 20 μm, respectively. In general, when a polymer comprises fluorogroups it is preferred that fluorine atoms are found on substantially all available sites, e.g. that hydrogen atoms are substituted with fluorine atoms.

The oleophobic filter may be placed so that the cathode catalyst is in diffusive communication with a gaseous oxidant. Thus, the inner housing together with the oleophobic filter can be considered to form an "outer surface" of the power pack. Thereby, the entry points into the power pack will be provided by the holes, e.g. for fuel, in the inner housing and the oleophobic filter for gaseous oxidant and waste components. Thus, the oleophobic filter will hinder liquids, i.e. both hydrophilic and hydrophobic liquids, from entering into the cathode section. By providing a hindrance for liquids the oleophobic filter protects the interior, especially the cathode section, from contaminants from the ambient environment.

The optional oleophobic filter is especially advantageous when the cathode section of the DAFC also contains an anion-exchange membrane. The oleophobic filter generally hinders liquids, and thereby also the majority of negative ions from entering the cell, and the few that do enter can be sequestered in the anion-exchange membrane. Thus, the oleophobic filter improves the function of an anion-exchange membrane. The combination of the oleophobic filter and the anion-exchange membrane are therefore especially suited for a DAFC to be used in close contact with an active surface, such as the skin of a human being, and the DAFC according to the invention is therefore especially suited for a hearing aid or similar devices, e.g. a smart watch or a smart phone. The oleophobic filter will minimise penetration of liquids, e.g. sweat, into the cathode section so that when the DAFC comprises both an oleophobic filter and an anion-exchange membrane, the amount of chloride ions, e.g. from sweat, reaching the anion-exchange membrane will be minimised, and thereby the life time of the anion-exchange membrane will be extended compared to a DAFC not having the oleophobic filter. Correspondingly, the anion-exchange membrane extends the life time of the DAFC by minimising or preventing penetration of chloride ions into the cathode section. Thus, the invention provides a DAFC for a microelectronic device to be worn by an end-user, e.g. a hearing aid or a smart watch, having an increased longevity.

In an embodiment the oleophobic filter has one or more openings aligned with the ventilation holes of the cathode collection element and/or the ventilation holes of the weld plate when used. The openings allow more efficient transfer of especially $H_2O$ as liquid, from the cathode section to the ambient environment. DAFCs employ electrochemical reactions and external influences may affect the speed of the electrochemical reaction, and thus the output, which means that there is a variation in how much water is produced. When more $H_2O$ is produced than can be contained in the air (saturation) the $H_2O$ condenses in the cell as liquid water, and this liquid water front can cause a blockade in the supply of air to the reaction. Occurrence of liquid $H_2O$ may cause flooding of the DAFC, so that by including openings in the oleophobic filter, the risk of flooding is minimised. The inventors have surprisingly found that when the oleophobic filter comprises openings, e.g. a slit for each ventilation hole, the openings allow that the DAFC is operated at a high relative humidity. Thereby the openings in the oleophobic filter are especially relevant for a microelectronic device to be worn by an end-user, e.g. a hearing aid or a smart watch, where sweat from the end-user may create local areas of high humidity in the vicinity of the microelectronic device. The openings are aligned with the ventilation holes of the cathode collection element and also of the optional weld plate, when present. For example, the oleophobic filter may have a single opening or it may have a number of openings up to the number of ventilation holes. It is also possible that the oleophobic filter has more than one opening aligned with a single ventilation hole. The opening may have any form desired, but it is preferred that the opening has the form of a slit in the oleophobic filter. It is further preferred that the slit has a continuous form, e.g. that sections of the slit do not cross each other. When the opening is a slit, it is preferred that the slit follows the longest line available from the shape of the ventilation hole. For example, when the ventilation hole is rectangular or square, the slit may follow the diagonal of the ventilation hole, and when the ventilation hole is circular, the slit may follow the diameter of the ventilation hole. Thereby, the optimal balance for hindering penetration of liquids while still allowing liquid waste $H_2O$ and gaseous oxidant through the oleophobic filter is obtained even though the oleophobic filter otherwise serves to hinder penetration of liquids.

The PEM may be considered a central layer immediately adjacent to the cathode catalyst and the anode catalyst in the cathode section and the anode section, respectively. The catalyst layers may be prepared from depositing an "ink" with catalyst particles, optionally on a support material, onto the PEM or a carbon substrate, e.g. CeTech carbon cloth W1S1009. The ink may be made of catalyst material, e.g HiSPEC 13100 from johnson matthey, a proton conductor, e.g. nafion, and other optional materials, e.g. PvP, in a solvent that can consist of any combination of a number of solvents, e.g. water, IPA, methanol etc. When the catalyst ink is deposited onto the PEM, it is called a catalyst coated membrane or CCM. When the catalyst ink is deposited onto a carbon substrate, which is the method chosen in the work presented here, it is called a gas diffusion electrode or just electrode.

The catalyst layers, e.g. the electrodes, may each face one or more additional diffusion layers, i.e. an anode diffusion layer and a cathode diffusion layer, that may be a carbon based fibrous material. The diffusion layers may also be referred to as the "anode WML" or the "cathode WML", respectively, and the anode and the cathode WML may be of the same material. The catalyst layer and the diffusion layer may also be integrated into one layer. The diffusion layers may further comprise sections, e.g. surface sections, with additional functionalities. For example, a WML may have a microporous layer of carbon particles and the microporous layer and/or the carbon fibres may have a hydrophobic treatment, e.g. a PTFE-derivatised surface. The PTFE surface can affect the mass transfer balances of the system, e.g. help push water from the cathode side to the anode side and help prevent flooding on the cathode side.

In the DAFC of the invention, a PEM is located between the anode catalyst and the cathode catalyst. Any material, e.g. the material known under the trademark "Nafion", that allows selective transportation of protons across the membrane may be used in the DAFC. The thickness of the PEM can be chosen freely, but the thickness will typically be in the range of 10 μm to 1 mm, e.g. from 50 μm to 500 μm, or from 100 μm to 250 μm. The PEM is structured to have a bottom and walls extending from the bottom to a containment distance into the cathode section, and wherein the cathode catalyst is located within the containment distance from the bottom. The containment distance will typically be up to 5 mm, e.g. in the range of 200 μm to 2 mm. The PEM is preferably made from a single piece of the membrane that has been shaped to have the bottom and the walls, and in this embodiment the PEM may be referred to as a "PEM cup". By containing the cathode section in a PEM cup, the DAFC will have a more compact design than is possible when the PEM has a planar shape, and moreover assembly of the DAFC is simplified. In particular, the PEM cup also functions as a gasket separating the anode section from the cathode section, and the PEM cup will also be both an electrical insulator and provide mechanical support to ensure optimal assembly. Thus, the PEM cup simplifies assembly of the power pack and allows a higher power output from a DAFC compared to a DAFC not having a PEM cup.

With the PEM cup it is possible to obtain a more efficient use of the housing area, which is important for the overall performance, and the PEM cup can be considered to be the minimal mechanical structure required to act as a gasket separating the anode side from the cathode side. Thus, the PEM cup optimises the power density in the DAFC.

The PEM may be a Nafion, e.g. Nafion 117, membrane and the PEM cup is typically formed using thermo- and/or vacuum forming, e.g. starting from a Nafion membrane of a thickness in the range of 90 μm to 200 μm. For example, the PEM cup may be hot-pressed into shape prior to assembly of the power pack. When the PEM cup has been made using thermo- and/or vacuum forming the PEM cup will be a continuous single piece of material without seams or the like, which further minimises the volume of the DAFC or the power pack.

The PEM cup may advantageously be used with a DAFC having an inner housing, in particular an inner housing that is also the anode collection element, e.g. an anode cup, or an inner housing that is also the cathode collection element, e.g. a cathode cup. When the PEM cup is used with an anode cup, the volume of the DAFC is minimised compared to when the PEM cup is used in another design of the DAFC, or when the inner housing contains a PEM of another shape, e.g. a flat or planar PEM. When the PEM cup is used with an inner housing, the containment distance will be shorter than the length of the inner housing, and correspondingly the dimensions, e.g. the "X-dimension" and the "Y-dimension" of the bottom of the PEM cup, will be smaller than the dimensions of the inner housing. However, due to the electrical insulation of the PEM cup, the PEM cup may be in contact with the inner walls of the inner housing, also when the inner housing is an anode cup or the cathode cup.

In a preferred embodiment, the DAFC has a PEM cup and a cathode collection element with a cathode terminal site formed as a single piece, e.g. a single piece of metal. For example, the cathode collection element and the cathode terminal site may be a single metallic piece, or a single piece made from a thermoplastic polymer with a coating of an electrically conducting metal or tracks of an electrically conducting metal. In particular, the cathode collection element with the cathode terminal site may have a bendable segment between the cathode collection element and the cathode terminal site. In this embodiment, the cathode collection element with the cathode terminal site is contained in the PEM cup, i.e. in the cathode section, and the wall of the PEM cup may have an opening, e.g. a cut-out, through which the cathode terminal site extends. It is also possible for the cathode terminal site to extend above the wall of a PEM cup not having an opening. In both embodiments, the DAFC may have a cathode terminal at a surface different from the surface having the cathode collection element so that the access to the cathode collection element, and thereby also the cathode catalyst, for a gaseous oxidant and for waste from the fuel cell. When the DAFC has a PEM cup with an opening, e.g. a cut-out, and a cathode collection element with a cathode terminal site extending through the opening, the volume of the DAFC is minimised.

When the PEM cup has an opening, e.g. a cut-out, for a cathode terminal site, the DAFC may advantageously have an inner housing, in particular an anode cup, which has an opening, e.g. a cut-out, in a wall, which opening is aligned with the opening of the PEM cup. Thereby, the total volume of the DAFC is minimised even further, and moreover the terminal site will be located at a surface of the inner housing, e.g. the anode cup, pointing away from the surface having the cathode collection element.

The DAFC can be considered to burn an alcohol, typically methanol, so that the DAFC employs, in addition to the alcohol fuel, a gaseous oxidant, e.g. $O_2$, especially $O_2$ contained in ambient air. Other gaseous oxidants are also contemplated. The reaction between $O_2$ and the alcohol will create $CO_2$ and $H_2O$, e.g. gaseous $H_2O$, as waste components. The ventilation holes in the cathode collection element and the optional weld plate allow that waste products can easily leave the DAFC and that gaseous oxidant, e.g. ambient atmosphere, can easily enter the cathode section.

The selective diffusion of protons across the PEM allows that an electrical potential is created between the anode collection element and the cathode collection element, e.g. as represented by the respective terminal sites. The anode collection element is therefore electrically isolated from the cathode collection element, including the respective terminal sites. The electrical isolation may be obtained using any electrically insulating material, e.g. a polymer.

The DAFC has a cathode collection element having ventilation holes. It is to be understood that the "ventilation holes" may be only a single hole or a plurality of holes. The cathode collection element is electrically conducting and preferably made from a single piece of metal, e.g. a stainless steel, optionally coated with a layer of gold. It is preferred that the cathode collection element and the cathode terminal site are a single piece. Likewise, when the DAFC has a weld plate, the weld plate also has ventilation holes. It is preferred that the ventilation holes of the optional weld plate are aligned with the ventilation holes of the cathode collection element, e.g. that the weld plate and the cathode collection element have the same number of ventilation holes at the same locations relative to the area of the cathode section.

It is preferred that the terminal sites, i.e. the anode terminal site and/or the cathode terminal site, are located on an outer surface of the DAFC, e.g. on an outer surface of an external housing containing the DAFC. It is especially preferred that the terminal sites are located at a different surface than the surface with the cathode collection element, and the optional weld plate, having ventilation holes. Thereby, it is possible for the DAFC to be in electrical contact with a microelectronic component or a further DAFC of the invention, without needing certain structural features that can block the ventilation holes, e.g. a seating or wall or the like of the microelectronic component or the further DAFC, and whatever is in front of the ventilation holes can be freely designed, e.g. ribs giving a controlled amount of ventilation to the cell. A further advantage of employing a cathode terminal at another surface than the surface having the cathode collection element is that pollution of the cathode section is minimised. In particular, establishing contact between the surface having the cathode collection element and an external unit, e.g. a microelectronic device, the act of establishing the contact can force contaminants, e.g. particles, into contact with the surface having the cathode collection element and thereby create a greater risk of polluting the cathode section with particulate contaminants. Thus, by employing a cathode terminal at another surface than the surface having the cathode collection element the risk of contamination of the cathode section with particles is minimised.

When the cathode collection element with the ventilation holes deviates from a planar structure, the non-planar structure allows for a large active area in the same cross-section. In contrast, a planar cathode collection element allows easier assembly of the DAFC of the invention with a microelectronic component and/or stacking with further DAFCs of the invention. In a specific embodiment the cathode collection element and/or the anode collection element have a planar structure. It is to be understood in the context of the invention that when the structure of a collection element is described, this description refers to the structure of the cathode collection element before mounting of the DAFC in a seating of a microelectronic component. The terminal sites electrically connected to the collection elements provide appropriate electrical connections between the terminal sites of the DAFC with the corresponding terminals of the microelectronic component.

The collection elements may be made from any material or materials. For example, the collection elements may be made from metal. Alternatively, the collection elements may be made from a non-conducting material, e.g. a thermoplastic polymer, provided with a metallic coating or provided with tracks, e.g. metallic tracks, which may be located on the surface of the polymer or in trenches in the polymer. In a preferred embodiment, the cathode collection element and the cathode terminal site are a single piece, in particular a single piece of metal, e.g. stainless steel optionally coated with gold.

The collection elements may have any thickness as desired. For example, the thickness may be in the range of 10 µm to 2 mm, e.g. 50 µm to 500 µm, e.g. about 100 µm. The collection elements may have a uniform thickness, or the collection elements may have different thicknesses. It is also possible for each of the collection elements to have non-uniform thicknesses. In the context of the invention a "uniform thickness" refers to an average thickness with due consideration of natural variations in thickness due to manufacturing, use, etc. of the collection element. For example, the uniform thickness may be an average value plus or minus 20%.

In an embodiment the collection elements are each made from a single piece of material, in particular from a metallic material. The material may optionally be coated with a metal, and in the context of the invention, a single piece of material coated with a metal, e.g. another metal, is still considered a single piece of material. It is especially preferred that the cathode collection element is made from a single piece of the metallic material, e.g. a single piece of metal, coated with another metal. Ductile metals may be used, but stiff metals are especially preferred, since the cathode collection element may represent an outer surface of the DAFC so that a stiff material better retains the structure of the DAFC. Exemplary metallic materials comprise stainless steel, e.g. austenitic stainless steel, such as AISI 316L, nickel, silver, platinum or their alloys; or stainless steel, e.g. austenitic stainless steel, nickel, or their alloys, coated with a layer of gold or platinum. A coating with another metal, e.g. gold or platinum, will typically provide a layer of the other metal at a thickness in the range of 0.1 µm to 50 µm, e.g. 0.5 µm to 10 µm. When the cathode collection element and/or the anode collection element are made from a single piece of material manufacture of the DAFC is simplified. Furthermore, the features may be made smaller than what is possible when the sections are made from different materials.

In a specific embodiment, the cathode collection element and its terminal site are made from a single piece of metal, and the collection element and the terminal site have, independently, a thickness in the range of 50 µm to 500 µm, e.g. 100 µm to 300 µm. The same is relevant for the anode collection element and its terminal site.

In a specific embodiment, the cathode collection element and/or the anode collection element is/are stamped, e.g. to its final shape, from a sheet of an appropriate metal, e.g. stainless steel, such as austenitic stainless steel. The collection elements may subsequently be coated with another metal, e.g. gold. In another embodiment, the cathode collection element and/or the anode collection element is cut from a metal plate using any appropriate technology, e.g. using shears or laser. The collection elements may be coated with another metal, e.g. gold, after cutting. In further embodiments the cathode collection element and/or the anode collection element are shaped to provide specific functions. For example, the anode collection element may take the form of the inner housing.

Coatings with gold and other noble metals provide efficient electrical contact due to the noble nature of the metal, and such coatings also provide corrosion resistance. However, corrosion resistance may also be obtained by specific treatment of the metal, in particular stainless steel.

The PEM separates the anode section from the cathode section, and in general the PEM will prevent fluid communication between the anode section and the cathode section, and the PEM may be considered to serve as a gasket. Any way of securing the PEM to the walls of the external housing or the anode cup may be used. The PEM thus has a side facing the fuel, i.e. the "anode section", and a side facing the oxidant, i.e. the "cathode section"; the PEM may also be described as having an "anode side", i.e. the side facing the anode section, and a "cathode side", i.e. the side facing the cathode section. The scale of a single DAFC is generally determined by the surface area of the PEM, e.g. at the anode side and the cathode side. The surface area of the anode side of the PEM is typically equal to the surface area of the cathode side of the PEM, although structural features at the respective sides may create differences in the surface areas of the cathode side and the anode side. In the context of the invention, the surface area of the PEM is the "superficial surface area", which does not take increases in surface area due to the surface structure into consideration. For example, the superficial surface area may be in the range of 0.05 $cm^2$ to 10 $cm^2$. The PEM may have any shape desired. For example, the PEM may be square with dimensions of 2 mm×2 mm, 5 mm×5 mm, or 10 mm×10 mm, or the PEM may be circular with diameters of 2.5 mm, 5 mm or 10 mm. When a PEM cup is used, these dimensions are relevant for the bottom of the PEM cup. Other relevant shapes are rectangular, elliptical, polygonal, etc. When the PEM has a superficial surface area in the range of 0.1 $cm^2$ to 1 $cm^2$, the DAFC can typically provide a continuous power output of up to 30 mW with peaks of 50 mW or more. For example, the continuous power output may be in the range of 10 mW to 25 mW. The voltage will typically be in the range of 0.1 V to 1 V, e.g. 200 mV to 600 mV, regardless of the superficial surface area of the PEM.

The cathode collection element generally has a bulk area corresponding to the area facing the cathode side of the PEM and an effective area corresponding to the bulk area minus the total area of ventilation holes, if present. For example, the collection element may have dimensions providing a bulk area in the range of 0.05 $cm^2$ to 10 $cm^2$, e.g. the collection element may have dimensions of 2 mm×2 mm, 5 mm×5 mm, or 10 mm×10 mm, or the collection element may be circular with diameters of 2.5 mm, 5 mm or 10 mm, or any combination of the dimensions.

The cathode collection element has ventilation holes, and likewise the optional weld plate also has ventilation holes. The ventilation holes allow that the gaseous oxidant can enter into the DAFC and come into contact with the cathode catalyst, and likewise the ventilation holes allow that the waste components can diffuse away from the DAFC. The ventilation holes typically have a total area in the range of 1% to 90%, e.g. from 5% to 50% or 10% to 50%, of the bulk area of the collection element. The same values are relevant for the weld plate. The total area of the ventilation holes may also be referred to as the "ventilation area". The cathode collection element, and the optional weld plate, may contain any number of ventilation holes as desired, but in general the number of ventilation holes is in the range of 4 to 20, e.g. 6 to 10, for a DAFC with a PEM having an area of about 1 cm². Thus, in an embodiment the cathode collection element has up to 15 ventilation holes per cm² of the PEM. The ventilation holes may have any shape as desired, and each ventilation hole may have an area, e.g. in the surface of the collection element or the weld plate, in the range of 0.5 mm² to 5 mm².

The cathode collection element, the anode collection element or both of the anode collection element and the cathode collection element, may comprise a bendable segment located between the collection element and the terminal site; the bendable segment may have any length as desired. In the context of the invention, the length of the bendable segment is defined by the distance between the collection element and the terminal site. For example, the bendable segment may have a length, e.g. for a DAFC with a PEM having an area of about 1 cm², in the range of 0.5 mm to 5 mm, e.g. between 1 mm and 2 mm. For DAFCs with larger PEMs the length of the bendable segment may be proportionally longer. Correspondingly, the cathode collection element may be considered to have a length in the dimension parallel with the length of the bendable segment, and a width in the dimension axial to the length of the bendable segment. The bendable segment also has a width in the dimension axial to the length of the bendable segment. The length of the cathode collection element is typically in the range of 5 mm to 25 mm. The width of the cathode collection element, e.g. the width of the collection element, is typically in the range of 2 mm to 10 mm. The width of the bendable segment is generally in the range of 0.5 mm to 2 mm. The terminal site may have a length in the range of 2 mm to 10 mm and a width in the range of 0.5 mm to 5 mm.

The DAFC of the invention comprises a "fuel supply". The fuel supply may be integrated with the DAFC so that the DAFC contains a fuel reservoir, e.g. in an external housing optionally also containing the power pack. Alternatively, the DAFC is in fluid communication with an external reservoir via an appropriate conduit. Regardless of the location of the reservoir the DAFC may comprise conduits and ports between the fuel supply and the anode section. When the DAFC, e.g. a DAFC with a PEM having an area of about 1 cm², has a reservoir, the reservoir will typically have a volume in the range of 10 µL to 2 mL, e.g. 50 µL to 500 µL, such as about 100 µL, about 200 µL, about 300 µL or about 400 µL. For DAFCs with larger PEMs the volume of the reservoir may be proportionally larger.

The DAFC, including the optional reservoir, may be integrated into a microelectronic device, e.g. a hearing aid, or the DAFC may be a separate unit for mounting in an appropriately designed seating. For example, the seating may have electrical terminals for establishing electrical connection to the terminal sites of the DAFC when the DAFC is mounted in the seating. Regardless whether the DAFC is a separate unit or whether it is integrated into a microelectronic device, the DAFC may be contained in an external housing. The external housing is generally a liquid tight container with appropriate openings for providing alcohol fuel and gaseous oxidant to the fuel cell components. In an embodiment, the external housing is made from an electrically non-conducting material, e.g. a polymer, such as a thermoplastic polymer. In another embodiment, the external housing is made from a material in electrical connection with the anode catalyst or cathode catalyst, e.g. in the form of an anode cup or a cathode cup, respectively. In this embodiment the external housing can be the anode terminal or the cathode terminal, respectively.

The external housing may fully enclose the fuel cell components, e.g. the power pack, or one or more of the fuel cell components may provide an outer surface of the DAFC. For example, in an embodiment the cathode collection element provides an outer surface, e.g. the "top", of the DAFC.

The presence of a pervaporation membrane, in particular a negatively charged pervaporation membrane, in the anode section as defined above advantageously allows that the DAFC may be used with an alcohol fuel, e.g. methanol, at a concentration of at least 10 M, e.g. a concentration in the range of 15 M to pure methanol, which in turn allows that the alcohol fuel is transported passively to the anode catalyst and the PEM. In particular, the pervaporation membrane allows that the fuel is pure methanol, i.e. corresponding to a "concentration" of 24.7 M. However, it is also possible for the DAFC to have a pump, e.g. an integrated micropump, for transporting the alcohol fuel from the reservoir to the anode catalyst. Likewise, the gaseous oxidant is transported passively to the cathode catalyst and the PEM, although active transportation is also contemplated. The DAFC can thus be used without actively pumping the alcohol fuel into the anode section. In the context of the invention, "passive" means that alcohol fuel is not actively pumped into the anode section. Thereby, the size of the DAFC can be kept minimal for easy integration into microelectronic devices.

When the DAFC has an anode cup as defined above, a PEM cup and a pervaporation membrane, e.g. with or without negative charges, the DAFC can be operated passively and omnidirectionally without active pumping of the alcohol fuel to the anode section, and in turn the volume of the power pack can be kept so small that the DAFC can have a higher energy density than a lithium ion battery.

In a further aspect, the invention relates to a microelectronic device comprising the DAFC of the invention. The microelectronic device may be any device requiring a power supply of up to 100 mW. A preferred microelectronic device is a hearing aid. Other relevant microelectronic devices include smart watches, smart phones and the like. For example, a microelectronic device may have a dimension limited in size to 10 mm, e.g. two dimensions may be limited to have a size up to 10 mm.

In a further aspect, the invention relates to a method of operating a DAFC. The method may employ any DAFC of the invention, and the DAFC may be comprised in a microelectronic device. Thus, after providing the DAFC, e.g. in a microelectronic device, a fuel is supplied to the DAFC, e.g. by bringing the fuel into diffusive communication with the anode section. The DAFC advantageously allows alcohol fuels of high concentration to be oxidised in the DAFC, and the fuel may have a methanol concentration in water of at least 10 M, e.g. a concentration of methanol in the range of 15 M to pure methanol. Thus, an aqueous solution of methanol at a concentration of at least 10 M is supplied to the DAFC.

All embodiments and variations, and their corresponding effects, described for the DAFC of the invention are equally relevant for the microelectronic device and the method of the invention, and vice versa.

BRIEF DESCRIPTION OF THE DRAWINGS

In the following the invention will be explained in greater detail with reference to the schematic drawings, in which.

DETAILED DESCRIPTION OF THE INVENTION

Figure 1:
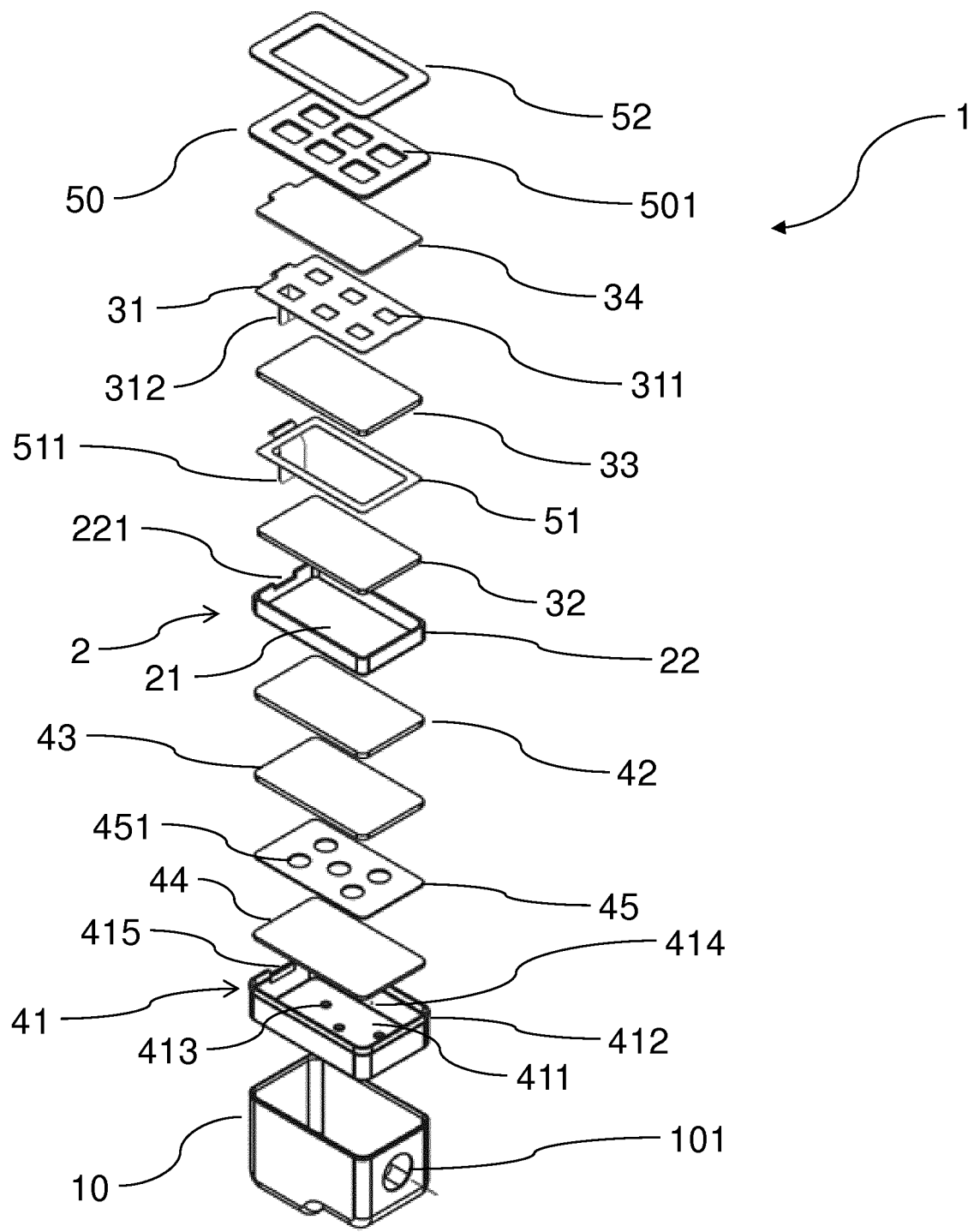
FIG. 1 shows an exploded drawing of fuel cell components of a direct alcohol fuel cell (DAFC) of the invention.

The present invention relates to a direct alcohol fuel cell (DAFC), to a microelectronic device and to a method of operating a DAFC of the invention. The DAFC has a proton exchange membrane (PEM) separating an anode section from a cathode section, and the PEM is structured to have a bottom and walls extending from the bottom to a containment distance into the cathode section, and wherein the cathode catalyst is located within the containment distance from the bottom.

The DAFC of the present invention is especially suited for a microelectronic device. The microelectronic device may be any electronic device requiring a power input up to 30 mW, e.g. in the range of 1 mW to 10 mW. The microelectronic device may be any microelectronic device, but a preferred microelectronic device is a hearing aid.

The DAFC of the present invention may use any alcohol as fuel. Preferred fuels include methanol and ethanol. When the DAFC employs methanol as a fuel it may also be referred to as a direct methanol fuel cell (DMFC). Correspondingly, the DAFC may be a direct ethanol fuel cell (DEFC). The alcohol will typically be provided as an aqueous solution, and the concentration of the alcohol may be chosen freely. Typical concentrations of methanol (in water) for DMFCs are in the range of 1 M to 3 M, but in the DAFC of the present invention the cell design allows a much higher concentration, i.e. up to pure methanol corresponding to 24.7 M, and the concentration of methanol will typically be at least 5 M, e.g. in the range of 10 M to 24.7 M, such as about 20 M. In a DAFC the alcohol is gradually oxidised to eventually be converted to $H_2O$ and $CO_2$ as waste products. Consequently, in the context of DAFCs the intermediary oxidation states from the alcohol to the final waste products may also be employed as fuel, e.g. for a DMFC formaldehyde and formic acid may also be used as fuel.

The DAFC contains a proton exchange membrane (PEM). The PEM may also be referred to as a polymer electrolyte membrane, and the two terms may be used interchangeably. At the PEM protons are supplied through a catalytic process of the fuel, and any material with this property may be employed. Exemplary PEMs comprise the perfluorosulphonic acid ionomer sold under the trade name Nafion (e.g. N1110 or Nafion 117) by DuPont who developed it in the 1960s. Other examples of appropriate materials employ linear polymers, such as styrene, styrene-derivatives, poly (arylene ether)s, sulphonation of existing aromatic polymers, co-polymers from sulphonated monomers, poly(imide)s, altered backbone polymers, poly-phosphazene. Yet other approaches have involved the introduction of silica in polymer electrolyte membrane polymer formulations.

The DAFC contains catalysts in the anode section and in the cathode section. The catalysts generally comprise a catalytic metal, e.g. platinum or platinum-ruthenium, on a support material, e.g. carbon, with electron conductive properties. Appropriate metals for the anode catalyst and the cathode catalyst are well-known to the skilled person who can select the metals freely. Likewise, support materials may also be selected freely. For example, the catalyst may comprise particulate, e.g. nanoparticulate, carbon, with catalyst nanoparticles of platinum or platinum-ruthenium. Appropriate catalysts structures, and their manufacture, for the DAFC are disclosed in WO 2014/005598. Another catalyst is known as Johnson Matthey HiSPEC 13100 which is platinum, nominally 70% on high surface area advanced carbon support.

The DAFC may contain other components as desired. For example, the DAFC may employ water management layers, e.g. microporous structures, and gas diffusion layers, e.g. a microporous layer on which the catalytic structure may be situated, e.g. platinum on a carbon support, which provides the catalytic conversion of the fuel to an electrical current. Likewise, the DAFC may contain gaskets and the like for making the DAFC and its layers fluid tight and for providing electrical insulation at appropriate sites, e.g. between terminal sites.

An exploded drawing of fuel cell components is depicted in FIG. 1. Briefly summarised, FIG. 1 depicts an embodiment of the DAFC 1 of the invention. The DAFC 1 has a PEM 2 separating the anode section from the cathode section. The anode section contains an anode collection element 41 electrically connected to an anode catalyst layer 42. Between the anode collection element 41, which is shaped to be an inner housing by having a bottom 411 and walls 412 extending from the bottom 411 to a length sufficient to contain the anode section and also the cathode section, and the anode catalyst layer 42 is a pervaporation membrane 44, a spacer insert layer 45 and an anode diffusion layer (or water management layer) 43. The cathode section contains a cathode collection element 31 with ventilation holes 311 and electrically connected to a cathode catalyst layer 32, and between the cathode collection element 31 and the cathode catalyst layer 32 is a cathode diffusion layer (or water management layer) 33. The cathode section further comprises an oleophobic filter 34, and it may additional comprise an anion-exchange membrane (not shown). Finally, the DAFC 1 contains isolator 51, gasket 52 and weld plate 50, that are used to assemble the DAFC 1. When the anode collection element 41, or anode cup 41, is finally assembled to contain both the anode section and the cathode section, the assembly is thus a power pack for a fuel cell. The power pack may be inserted in an external housing 10. The external housing 10 has a fuel inlet 101, and the anode cup 41, which has holes 413 providing fluid communication with the fuel reservoir (not shown) in the external housing 10. Specifically, the external housing 10 is attached to the power pack to form the reservoir.

Figure 2:
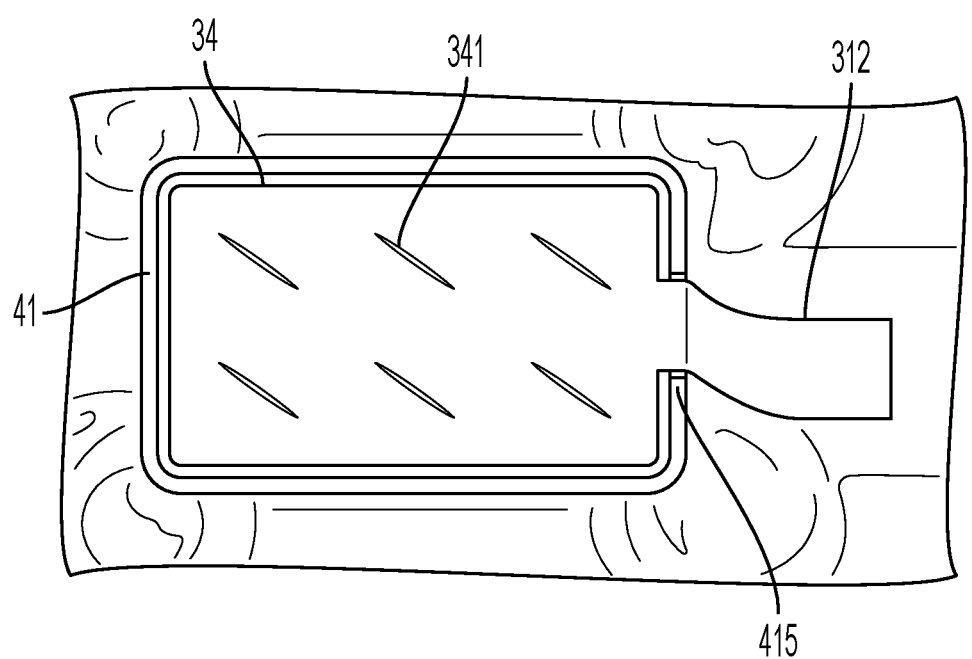
FIG. 2 shows a top view of a power pack of the invention.

FIG. 2 shows a top view of the partly assembled power pack. The features shown in the embodiment in FIG. 1 and FIG. 2 are discussed more elaborately below in Example 1.

EXAMPLES

Example 1

In the embodiment depicted in FIG. 1, the inner housing is the anode collection element 41. The anode collection element 41 may also be referred to as an "anode cup", and the term "anode cup" will also refer to the inner housing when the inner housing is the anode collection element 41. Likewise, the reference numeral 41 also refers to the anode cup 41.

The anode collection element 41 is prepared from AISI 316L stainless steel. Specifically, a sheet of 0.2 mm stainless steel has been punched to provide the anode cup so that the bottom 411 has an area of 8.35 mm×4.80 mm corresponding to the size of the fuel cell components in the anode section. The anode cup 41 may be coated with gold. The anode cup 41 has a height sufficient to house the anode section and also the cathode section as explained below.

The bottom 411 of the anode cup 41 has holes 413, e.g. 5 holes 413 of a diameter of about 500 µm that allow fluid communication across the bottom 411. Alternatively, the holes 413 may be in the range of 100 µm to 1500 µm.

A pervaporation membrane 44 of 8.35 mm×4.80 mm size and a thickness of 150 µm is placed at the bottom 411 of the anode cup 41. The pervaporation membrane 44 consists of a poly-tetrafluoroethylene (PTFE) backbone with perfluoroether pendant side chains terminated by sulphonic acid; an exemplary pervaporation membrane 44 is marketed by Solvay under the trademark Aquivion E98-15S. The pervaporation membrane 44 allows methanol vapour to pass through from a liquid fuel so that the pervaporation membrane 44 provides pervaporative communication from below the anode cup 41 to the anode section. Furthermore, the negative charges of the sulphonic acid groups provide a cation-exchange function so that metal ions are sequestered from liquids diffusing into the pervaporation membrane 44, and thereby metal ion contamination of the DAFC 1 is avoided. However, the pervaporation membrane 44 may also be a PTFE backbone without charged groups. Such a pervaporation membrane 44 prevents direct fluid communication from the fuel supply to the PEM while still allowing pervaporative communication, and thereby also diffusive communication. The distance from the PEM 2 to the pervaporation membrane 44 may also be referred to as the spacing distance.

On top of the pervaporation membrane 44 is placed a spacer insert 45. The spacer insert 45 may also be referred to as a PM insert. The spacer insert 45 has been prepared from a 100 µm sheet of AISI 316L stainless steel, and it has 5 holes 451, e.g. distributed as shown in FIG. 1, of 1.2 mm diameter. The spacer insert 45 may be coated with gold, as is done in the present embodiment. The spacer insert 45 improves the electrical connection between the anode catalyst layer 42 and the anode cup 41, and the holes 451 allow access of the fuel, e.g. methanol, to the anode catalyst 42 layer.

The distance between the PEM 2 and the spacer insert 45 is about 500 µm, and about halfway between the PEM 2 and the spacer insert 45 the wall 412 of the anode cup 41 has, e.g. in the middle of the longer wall section of the wall 412 of the anode cup 41, a venting hole 414 of a diameter of 50 µm. Specifically, the centre of the venting hole 414 is placed at about 250 µm from the spacer insert 45 of the anode cup 41. The venting hole 414 allows vapour of $H_2O$ and $CO_2$ produced in the DAFC 1 to leave the anode section. When the diameter of the venting hole 414 is in the range of 25 µm to 300 µm, penetration of $O_2$ into the anode section as well as fuel losses from the anode section are minimised. Thereby the venting hole 414 provides a more efficient DAFC 1.

On top of the spacer insert 45, i.e. relative to the bottom 411 of the anode cup 41, is placed an anode diffusion layer 43 (the diffusion layer may also be referred to as a water management layer). The anode diffusion layer 43 is a fibrous carbon material that is generally known as carbon paper. The carbon fibre material may also have a microporous layer of carbon particles and the carbon fibre substrate and/or the microporous layer may have a hydrophobic, e.g. a PTFE-derivatised, treatment. Being fibrous, the anode diffusion layer 43 can be compressed but its thickness in an uncompressed state is 250 µm, and furthermore, the fibrous material may be described with an area weight; an appropriate area weight is in the range of 120 $g/m^2$ to 150 $g/m^2$. An exemplary fibrous material to use for the anode diffusion layer 43 is marketed as H23C6 by Freudenberg.

The spacer insert 45 and the anode diffusion layer 43 have dimension corresponding to the bottom 411 of the anode cup 41, i.e. 8.35 mm×4.80 mm, but the sizes of the spacer insert 45 and the anode diffusion layer 43 are not critical and smaller dimension are also possible, e.g. to 80% of the dimensions of the bottom 411 of the anode cup 41.

The anode catalyst layer 42 and the cathode catalyst layer 32 each comprise a substrate carbon cloth and a layer of a support material with catalytic metal nanoparticles; the support materials are carbon particle materials with high specific surface areas. In this embodiment, the anode catalyst layer 42 and the cathode catalyst layer 32 may also be referred to as gas diffusion electrodes. Thus, a gas diffusion electrode, i.e. the anode catalyst layer 42, is then placed on top of the anode diffusion layer 43 relative to the bottom 411 of the anode cup 41. The anode catalyst layer 42 is a carbon cloth substrate with a layer of carbon support with a high specific surface area carrying catalytic nanoparticles. For example, the carbon support may carry appropriate metallic nanoparticles having a specific surface area of at least 50 $m^2/g$. A typical catalyst layer has about 20% to 80% by mass of metal to carbon. The anode catalyst layer 42 has a mixture of platinum and ruthenium as the catalytic metal. An appropriate anode catalyst material is marketed by Johnson Matthey under the trademark HiSpec, e.g. HiSpec 13100, HiSpec 12100, etc. The thickness of the anode catalyst layer 42 in FIG. 1 is 500 µm to 600 µm when the anode catalyst layer 42 is in an uncompressed state. Of this value the catalyst layer is about 150 µm to 250 µm.

The PEM 2 is placed on the anode catalyst layer 42. In this embodiment, the PEM 2 is structured to have a bottom 21 and walls 22 extending from the bottom 21 to a containment distance into the cathode section; the containment distance is sufficient to contain the cathode section. In this embodiment the PEM 2 may also be referred to as the PEM cup 2, and the reference numeral 2 will also refer to the PEM cup 2. By having PEM cup 2 housing the cathode section, which in turn is housed in the anode cup 41, a very compact design of the DAFC 1 is obtained. Since the PEM cup 2 is contained in the anode cup 41, the area of the bottom 21 of the PEM cup 2 is correspondingly smaller. In the present embodiment, the bottom 21 has dimensions, i.e. dimensions inside the PEM cup 2, of 8.05 mm×4.50 mm.

The PEM 2 may be made from any material allowing selective transportation of protons across the membrane. Typically, the PEM 2 is made from a polymeric material having a PTFE backbone with perfluoroether pendant side chains terminated by sulphonic acid. Exemplary materials are marketed by Dupont under the trademark Nafion. In the embodiment depicted in FIG. 1, the PEM 2 is Nafion 117 with a thickness of about 175 µm. The PEM cup 2 has been shaped, e.g. hot-pressed. from a single sheet of Nafion 117. Thereby, the PEM 2 can also serve as a gasket to prevent undesired fluid communication to the cathode section and the area of the anode cup 41 is used more efficiently so that a larger effective area is achieved.

A gas diffusion electrode, i.e. the cathode catalyst layer 32, is then placed in the PEM cup 2. The same materials as relevant for the anode catalyst layer 42 are relevant also for the cathode catalyst layer 32. In the embodiment of FIG. 1, a HiSpec 13100 material is deposited together with Nafion on a carbon cloth and is cut to dimensions of 8.05 mm×4.50 mm, and the thickness of the cathode electrode layer 32 is 450 µm to 500 µm when the cathode catalyst layer 32 is in an uncompressed state of which the catalyst layer is 100-150 µm.

A cathode diffusion layer 33 is placed on the cathode catalyst layer 32. As for the anode diffusion layer 43, the cathode diffusion layer 33 is also H23C6, and the same materials are relevant for both diffusion layers.

The cathode catalyst layer 32 and the cathode diffusion layer 33 are shown with an isolator 51 between them. In the embodiment of FIG. 1, the isolator 51 is made from the electrically insulating material Kapton HN500 (as marketed by Dupont). Kapton is a polyimide film, and any polyimide film may be used for the isolator 51. The isolator 51 has a thickness of about 50 µm, and in FIG. 1 the isolator 51 is shown with a flap 511 placed at an approximate right angle to the isolator 51. Upon assembly of the power pack the flap 511 will extend from the PEM cup 2 and the anode cup 41 through cut-outs in the walls of PEM cup 2 and the anode cup 41. Thus, the wall 22 of the PEM cup 2 may have an opening 221, e.g. a cut-out, and wall 412 of the anode cup 41 may have an opening 415, e.g. a cut-out; the openings are aligned to allow the flap 511 to extend through them. After assembly the flap 511 may be placed along the wall of the external housing 10, if used, or the anode cup 41 in order to provide a site for a cathode terminal that is electrically insulated from the anode cup 41, including the bottom of the cut-out 415.

The isolator 51 has a cut-out section allowing physical contact between the cathode catalyst layer 32 and the cathode diffusion layer 33 over the majority of the areas for the cathode catalyst layer 32 and the cathode diffusion layer 33.

A cathode collection element 31 with ventilation holes 311 is placed in contact with the cathode diffusion layer 33. The ventilation holes 311 allow diffusion of gaseous oxidant to the PEM 2 and waste gasses away from the PEM 2. The cathode collection element 31 has been stamped from a 200 µm sheet of AISI 316L stainless steel, which has subsequently been coated with gold. The cathode collection element 31 is shown with 6 ventilation holes 311 but fewer or more ventilation holes 311 may also be used. In the depicted embodiment, the ventilation holes 311 are rectangular with dimensions of 1.2 mm×0.9 mm.

The cathode collection element 31 has a cathode terminal site 312 shown at a right angle to the cathode collection element 31. The placement of the cathode terminal site 312 complies with the flap 511 of the isolator 51, and the cathode terminal site 312 extends through the same cut-outs in the anode cup 41 and the PEM cup 2. After assembly of the power pack the cathode terminal site 312 may be bent at a bendable segment located between the cathode collection element 312 and the cathode terminal site 312. In particular, the cathode terminal site 312 may be bent towards the anode cup 41 where the flap 511 of the isolator 51 ensures that the cathode terminal site 312 is electrically insulated from the anode cup 41 and the corresponding anode terminal. Thereby, the cathode terminal site 312 with the bendable segment allows a compact design of the power pack and also the DAFC 1.

The part of the cathode collection element 31 located in the cathode section has dimensions of 8.05 mm×4.50 mm, although it is not required to have the same dimensions as the bottom of the PEM cup 2; in particular, the dimensions of the cathode collection element 31 located in the cathode section may be from 80% of the dimensions of the bottom of the PEM cup 2.

On the cathode collection element 31 is placed an oleophobic filter 34 with dimensions of 8.05 mm×4.50 mm. The oleophobic filter 34 is an uncharged microporous PTFE membrane with a thickness of 180 µm and a pore size of 0.4 µm. Specifically, the oleophobic filter 34 is a PMV15T membrane from Porex. The oleophobic filter 34 prevents penetration of liquids into the cathode section while at the same time allowing penetration of gasses, e.g. waste gasses from the DAFC 1 and gaseous oxidant into the cathode section. The oleophobic filter 34 further provides electric insulation between the weld plate 50 and the cathode collection element 31.

In FIG. 2, the oleophobic filter 34 is inserted in the anode cup 41, and FIG. 2 shows the cut-out 415 in the anode cup 41. The cathode terminal 312 is shown extending from the anode cup 41 via the cut-out 415. The embodiment of oleophobic filter 34 depicted in FIG. 2 has 6 slits 341 located so as to be aligned with the six ventilation holes 311 of the cathode collection element 31, which is located below the oleophobic filter 34. The slits 341 are depicted as diagonal cuts for each ventilation hole 311. The slits 341 allow transfer of $H_2O$ as liquid, through the oleophobic filter 34. However, the DAFC 1 will also function without the slits 341.

The DAFC 1 further comprises an anion-exchange membrane (not shown) located between the cathode collection element 31 and the cathode diffusion layer 33. The anion-exchange membrane may be a fumapem FAA-3-30 membrane (Fumatech BWT GmBH, Bleitigheim-Bissingen, Germany). The anion-exchange membrane may alternatively be a hydrogel with amine groups, in particular quaternary amine groups. The anion-exchange groups will sequester negatively charged ions, in particular chloride ions, from liquids diffusing through the anion-exchange membrane. Thus, when an anion-exchange membrane is employed the fuel cell interior, e.g. the cathode section, is protected from sweat. Thereby, the anion-exchange membrane provides a power pack and a DAFC 1 especially suited for use in a hearing aid.

The power pack can now be finalised by welding a weld plate 50 with the anode cup 41 or the external housing 10. Thus, the weld plate 50, which has dimensions corresponding to the dimensions of the bottom of the anode cup 41 thereby allowing the enclosure of the anode section and the cathode section in the anode cup 41 is placed on top of the oleophobic filter 34, and the weld plate 50 is then welded along the edge of the weld plate 50 to the wall of the anode cup 41. The weld plate 50 may be placed in the anode cup 41 and welded to the inner wall of the anode cup 41, or the weld plate 50 may be welded to the wall of the anode cup 41 at the top of the anode cup 41. Thereby, it is ensured that the power pack is as small as possible, which further optimises diffusion of fuel and waste gasses to and from the PEM 2.

The weld plate 50 has ventilation holes 501, which will be aligned with the ventilation holes 311 of the cathode collection element 31, and which have the same the same function as the ventilation holes 311, i.e. allowing diffusion of gaseous oxidant to the PEM 2 and waste gasses away from the PEM 2. The weld plate 50 has been prepared from a 200 µm sheet of AISI 316L stainless steel. The weld plate 50 will generally not have a coating as it is not used as an electrical terminal, even though by welding to the anode cup 41 any section of the weld plate 50 may serve as an anode terminal site.

The now assembled power pack has dimensions of 9.0 mm×5.5 mm×2.5 mm. The full outer surface of the anode cup 41 can serve as an anode terminal site, and the power pack may have a cathode terminal site 312 extending from the power pack so that the anode terminal site and the cathode terminal site 312 may connect to corresponding terminal sites of an electrical circuit.

The power pack, or the DAFC with the external housing, may comprise a gasket 52, e.g. a silicone gasket, that electrically insulates the power pack or DAFC for integration with an external microelectronic device; the gasket 52 further allows a fluid tight integration with the external microelectronic device.

The power pack may be used as a DAFC with an appropriate fuel supply. However, in the embodiment depicted in FIG. 1, the power pack is placed in an external housing 10 so that the holes 413 in the anode cup 41 face a fuel reservoir contained in the external housing. The external housing 10 can be considered to be the reservoir. In the embodiment of FIG. 1, the external housing 10, i.e. the fuel reservoir, is located below the anode section and the fuel is in fluid communication with the anode section via the holes 413. The embodiment in FIG. 1 has a reservoir of a volume of about 200 µL.

As depicted in FIG. 1 the external housing 10 has been prepared from a sheet of AISI 316L stainless steel, which has dimensions for the anode cup 41 to generally fit snugly onto the external housing 10 with due consideration for allowing access to the venting hole 414. Alternatively, the wall of the external housing 10 may have a hole (not shown) aligned with the venting hole 414 for allowing diffusion from the venting hole 414. In particular, a hole in the wall of the external housing 10 may be larger than the venting hole 414, since the effects obtained with the venting hole 414 will not be jeopardised by the hole in the wall in the external housing. Alternatively, the venting hole 414 and the hole in the wall of the external housing 10 may be created after fitting the anode cup 41 in the external housing 10, e.g. using laser ablation or micro drilling etc.

The anode cup 41 and the external housing 10 may be welded or glued together. The anode cup 41 could also be pressed against a gasket 52. Due to the close contact between the surfaces of the anode cup 41 and the external housing 10, the outer surface of the external housing 10 may provide an anode terminal site. The wall of the external housing 10 may have a cut-out (not shown) through which the flap 511 and the cathode terminal site 312 can extend. The cathode terminal site 312 can then be bent towards the wall of the external housing 10 with the flap 511 providing electrical insulation between the external housing 10, i.e. the anode terminal site, and the cathode terminal site 312. Alternatively, the external housing 10 may be coated or otherwise covered with an electrically insulating layer to prevent short-circuits between the anode terminal site and the cathode terminal site 312; the anode terminal site may be exposed as desired by removing sections of the coating on the external housing 10.

The external housing 10 has a fuel inlet 101 for replenishing the fuel in the reservoir and removing spent fuel. The external housing 10 may have any appropriate valve or valves (not shown), and it may work together with an external supply of fuel employing an appropriate pump.

REFERENCE NUMERALS

1 Direct alcohol fuel cell (DAFC)
10 External housing
101 Fuel inlet
2 Proton exchange membrane (PEM)
21 Bottom of PEM
22 Walls of PEM
221 Opening in wall of PEM
31 Cathode collecting element
311 ventilation holes of cathode collecting element
312 Cathode terminal site
32 Cathode catalyst layer
33 Cathode diffusion layer
34 Oleophobic filter
341 Slit
41 Anode collecting element
411 Bottom of anode collecting element
412 Walls of anode collecting element
413 Hole in bottom of anode collecting element
414 Venting hole
415 Opening
42 Anode catalyst layer
43 Anode diffusion layer
44 Pervaporation membrane
45 Spacer insert layer
451 Hole of the spacer insert layer
50 Weld plate
501 Ventilation hole of weld plate
51 Isolator
511 Flap of isolator
52 Gasket Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A direct alcohol fuel cell (DAFC) comprising a proton exchange membrane (PEM) separating an anode section from a cathode section, which cathode section contains a cathode collection element electrically connected to a cathode catalyst, the cathode catalyst being in diffusive communication with a gaseous oxidant, and which anode section comprises an anode collection element electrically connected to an anode catalyst, the anode catalyst being in diffusive communication with a fuel supply, wherein the PEM is structured to have a bottom and walls extending from the bottom to a containment distance into the cathode section, and wherein the cathode catalyst is located within the containment distance from the bottom.

2. The DAFC according to claim 1, wherein the cathode collection element has a cathode terminal site, and the cathode collection element with the cathode terminal site is made from a single piece, and the PEM has an opening through which the cathode terminal site extends.

3. The DAFC according to claim 1, wherein the PEM has been made using thermoforming and/or vacuum forming.

4. A microelectronic device comprising a DAFC according to claim 1.

5. A method of operating a DAFC, the method comprising the steps of:
   providing a DAFC according to claim 1;
   supplying a fuel comprising an aqueous solution of methanol at a concentration of at least 10 M to the DAFC.

\* \* \* \* \*